May 10, 1949.  R. C. WALLACE  2,469,586
TOOL FOR CLEANING CONCAVE CYLINDRICAL SURFACES
Filed March 3, 1948
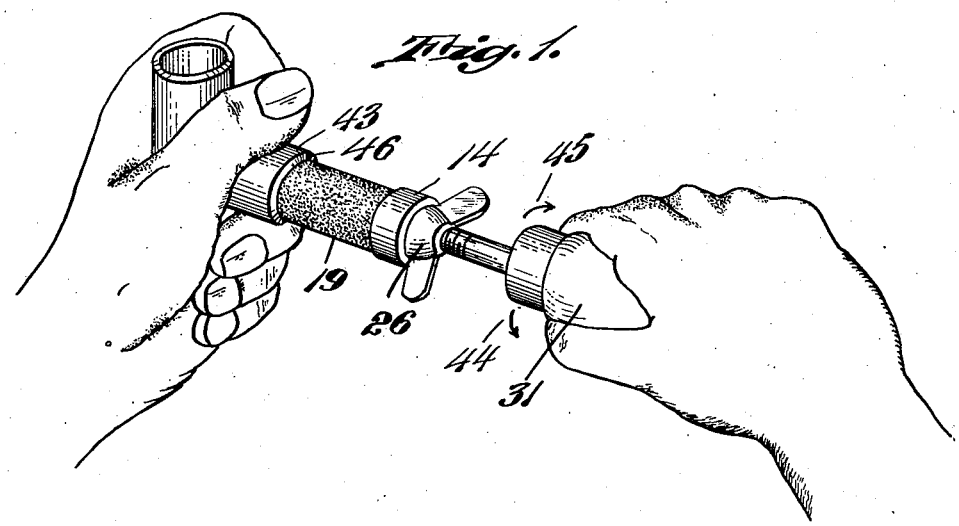
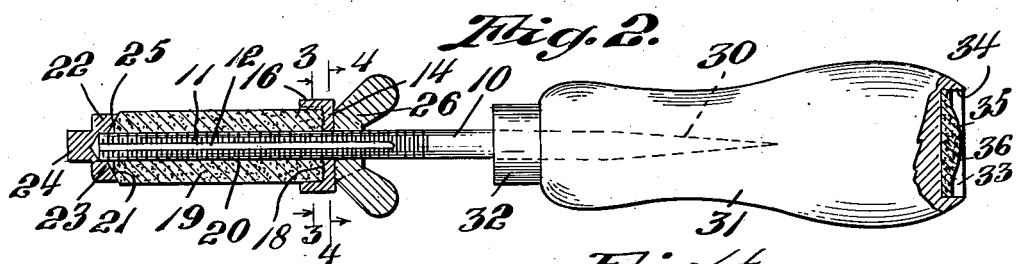
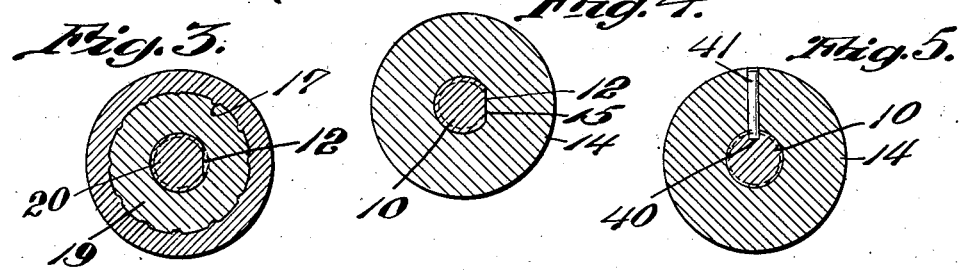
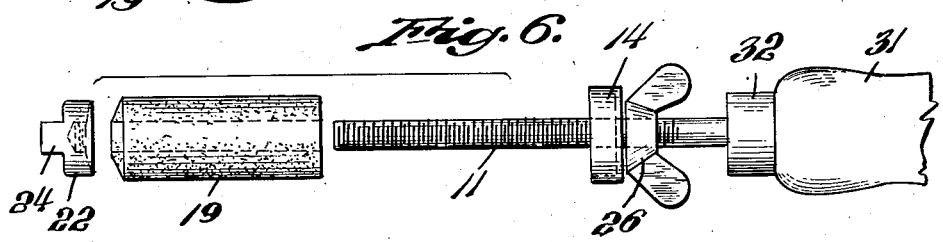
INVENTOR.
Raymond C. Wallace
BY
Barlow & Barlow
ATTORNEYS.

Patented May 10, 1949

2,469,586

UNITED STATES PATENT OFFICE 2,469,586

TOOL FOR CLEANING CONCAVE CYLINDRICAL SURFACES

Raymond C. Wallace, Pawtucket, R. I.

Application March 3, 1948, Serial No. 12,765

4 Claims. (Cl. 51—184.1)

This invention relates to a tool for cleaning a concave cylindrical surface such for example as is encountered in fitting a pipe into a joint.

In the fitting of a pipe into a joint, such as a T or elbow for soldering, it is essential that the surfaces which are to be joined by solder, brazing, or other metal shall be clean in order that the solder may penetrate the surface and become properly attached. There is some difficulty in cleaning the inside cylindrical surface of the joint, and wire brushes, or scraping tools for cleaning, and the like are often resorted to.

One of the objects of this invention is to provide an abrading tool which may be inserted into the cylindrical surface and after inserted, expanded so as to firmly engage the same, after which by movement of the tool relative to the surface to be cleaned foreign matter will be removed therefrom.

Another object of the invention is to provide a tool which will be elastically expandable so that as the same wears to a smaller diameter, its diameter may be increased.

Another object of this invention is to provide an arrangement at the ends of the diametrically expandable member so as to prevent the ends from splitting or fraying, which may happen where diametrical expansion occurs.

Another object of this invention is to provide a means for holding the abrading cylinder at one end by a member which will be of a diameter less than the cylinder, so that the outer marginal surface of the end may be available for engaging a shoulder of the fitting into which the pipe extends.

Another object of this invention is to provide a handle by which the tool may be readily manipulated.

Another object of this invention is to provide a handle and utilize the same as a means for mounting an abrading disk for engaging the end surface of the fitting and the pipe which are to be attached together.

With these and other objects in view, the invention consists of certain novel features of construction as will be more fully described and particularly pointed out in the appended claims.

Figure 1 is a perspective view illustrating a pipe fitting with the tool inserted into the same and illustrating how a rocking motion back and forth may be used for causing the tool to rub upon the inner cylindrical surface of the fitting;

Figure 2 is a central sectional view through the tool and showing the handle partly in section to expose the abrading disk in the end thereof;

Figure 3 is a section on line 3—3 of Figure 2;

Figure 4 is a section on line 4—4 of Figure 2;

Figure 5 is a sectional view illustrating a modified form of holding the abutment member against movement on the shank; and Figure 6 is an exploded view illustrating the several parts of the tool in detached relation.

In proceeding with this invention I provide a cylindrical shank which is threaded a part of its length. Upon this threaded shank there is provided an abutment member which is slidable but non-rotatable on the shank with a wing nut to engage and adjust the position of the same. On this shank an abrading member of rubber or like elastic resilient material is positioned, with another abutment secured by threading on the end of the shank, this abutment being of a diameter less than the abrading member. The surfaces of the two abutments which engage the abrading member are so arranged that although axial pressure may be placed upon the abrading member to enlarge its diameter, the ends of the abrading member are confined in such a way that they will not split or crack by reason of such pressure and expansion. A handle is positioned on the other end of the shank and in one end of the handle there is carried an abrading disk against which the ends of the pipe or joint may be pressed and turned so as to abrade and brighten up the end surface for reception of attaching solder or the like.

With reference to the drawings, 10 designates a shank which is threaded as at 11 from its top and flattened along the threaded portion of its length as at 12. An abutment 14 is provided with an opening to receive the shank, it having also a flat portion 15 across its otherwise circular hole to engage the flattened portion 12 so as to prevent rotation of this abutment member 14 on the shank. This abutment member is also provided with an annular flange 16 which is roughened by means of protuberances 17 on its inner surface, while the inner end surface 18 is also roughened for receiving and preventing rotation of the cylindrical abrading member 19 which is formed of rubber or some similar material containing abrasive grains therein. The material 19 is sufficiently elastic so that when pressure is placed upon its ends it will expand and increase its diameter. This cylindrical member has a bore 20 extending through it of a size to receive the shank 10, and is tapered as at 21 at one of its ends.

Another abutment member, acting as a nut, is designated 22, has a threaded recess 23 adapted to receive the end of the threaded shank 10. A portion 24 serves as a head for turning the same tightly into engagement with the shank. The surface 25 of this abutment member which faces the abrading member 19 is concave. This arrangement provides for a wedge action to force the material at the end of the abrading member inwardly as axial pressure is applied. This member 22 is also of a diameter smaller than the diameter of the abrading member 19 so that there is a portion of the end surface exposed which may engage a shoulder within the fitting.

A wing nut 26 engages the threads of the shank and presses against the abutment member 14 so that by turning this nut axial pressure may be brought to bear upon the abrading member 19, which will cause it to expand in diameter. However, as this expansion occurs, both ends of the member are restrained against expansion either by the flange 16 of the member 14 at one end or by the inward wedging pressure between the concave surface 25 of the nut 22 and the end of the cylindrical abrading member 19.

The opposite end of the shank 10 is tapered as at 30 and a handle 31 is forced upon this end of the shank. A ferrule 32 prevents splitting of the handle. A recess 33 is provided in the outer end of the handle so as to provide an annular wall 34 and an abrading disk 35 is received in this recess presenting a convex surface 36 which will be adapted to have the ends of the pipe or a joint pressed against it and turned to brighten up or clean the same.

In some cases instead of flattening the shank 10, the shank may be provided with a slot 40 and the abutment member 14 may have a key extending through it and entering the slot so as to prevent rotation thereof.

In use the cylindrical member 19 will be inserted into the fitting 43, the wing nut will be rotated until the proper enlargement of the abrading member occurs. Then there will be a rocking back and forth of the abrading member by means of the handle 31 as shown by arrows 44 and 45 so as to clean the inner surface of the fitting 10. The end surface 46 may then be engaged by the disk 35 and cleaned, after which the end of the pipe to be inserted will be cleaned similarly by the disk 35 while its outer end will be cleaned in some other manner which is of a more simple nature, as the outer convex surface of the pipe to be inserted is more readily accessible.

I claim:

1. A tool for cleaning a concave cylindrical surface comprising a threaded shank, a cylindrical member having an external abrading surface and an axial bore tightly engaging said shank, said member being formed of elastic resilient material which will increase its outer diameter as its axial dimension is reduced, and a member having an engaging surface slidably and non-rotatably mounted on said shank to compress said member axially and radially while restricting the diametrical expansion at its engaged end to prevent rotation of the same upon the shank.

2. A tool as in claim 1 wherein a member having a concave surface engages the outer end of said abrading member to force the outer end of said elastic member radially inwardly as axial pressure is applied.

3. A tool as in claim 1 wherein the inner surface of said cup is provided with means interlocking with said abrading member to prevent relative rotation of said members.

4. A tool for cleaning a concave cylindrical surface comprising a threaded shank, a cylindrical abrading member having a bore through which said shank extends, said member being of elastic material which will increase its radial thickness as its axial extent is decreased, an abutment member threadedly mounted on one end of the shank and having a concave surface for engaging one end of the abrading member, a second abutment member non-rotatably but slidably mounted on said shank engaging the other end of said abrading member and having a flange means to restrict the diametrical expansion of the abrading member, a nut on said threaded shank engaging said second abutment member to axially move the same toward the first abutment member to compress the abrading member against said concave surface and prevent rotation of the same on the shank.

RAYMOND C. WALLACE.

REFERENCES CITED

The following references are of record in the file of this patent:

UNITED STATES PATENTS

| Number | Name | Date |
|--------|------|------|
| 41,481 | Carr | Feb. 9, 1864 |
| 142,626 | Hapgood | Sept. 9, 1873 |
| 232,406 | Lamb | Sept. 21, 1880 |
| 284,548 | Gwyn | Sept. 4, 1883 |
| 363,898 | Labre | May 31, 1887 |
| 2,181,474 | Berger | Nov. 28, 1939 |
| 2,282,650 | Fenton | May 12, 1942 |